J. D. Norman,

Portable Fence,

Nº 80,657. Patented Aug. 4, 1868.

Witnesses:
S. C. Kemon
C. A. Pettit

Inventor:
Joseph D. Norman
By Munn & Co.
Attorneys

United States Patent Office.

JOSEPH W. NORMAN, OF EUGENE, INDIANA.

Letters Patent No. 80,657, dated August 4, 1868.

---

IMPROVEMENT IN PORTABLE FENCE.

---

The Schedule referred to in these Letters Patent and making part of the same.

---

TO ALL WHOM IT MAY CONCERN:

Be it known that I, JOSEPH W. NORMAN, of Eugene, in the county of Vermillion, and State of Indiana, have invented a new and improved Portable Fence; and I do hereby declare that the following is a full, clear, and exact description of the construction and operation of the same, reference being had to the annexed drawings, making a part of this specification, in which—

In this invention the pickets are connected together by links, and each panel is so attached to its supporting-posts that it can readily be detached, and folded or rolled up, forming a compact and easily-portable roll. The form of the post is also new.

Figure 1:
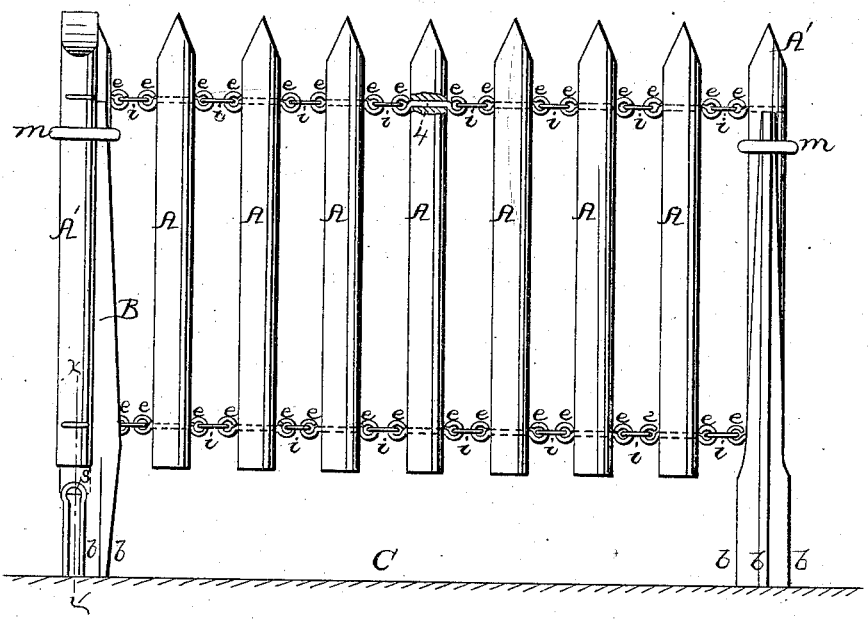
Figure 1 is a side elevation.
Figure 2:
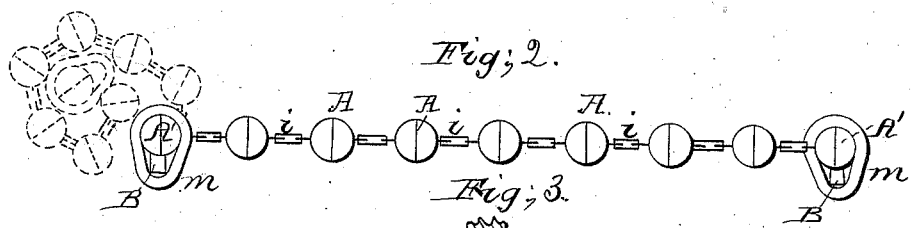
Figure 2 is a top view.
Figure 3:
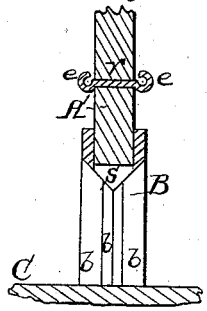
Figure 3 is a vertical section through the line $x\ x$ of fig. 1.

In the drawings, figs. 1 and 2 represent a panel of my fence, A A being the pickets, the two end ones of each panel being designated by A' A', B B being the supporting-posts.

Each supporting-post is of cast iron, and is formed with a long, tapering point, which is driven into the ground, and with a projecting socket, $s$, on its side, into which the lower extremity of an end picket, A', is stepped, for the purpose of supporting the panels.

The upper end of the pickets A' A' is confined securely to the posts B B by means of a sliding collar, $m\ m$, of any convenient form, which is slipped down over tops of the pickets and posts, encompassing both, and holding them closely together, as seen in figs. 1 and 2.

Below the socket $s$ each post is cast with four vertical wings or buttresses, $b\ b\ b\ b$. One of these buttresses terminates at the socket, its upper end being slightly expanded, and having a vertical recess or mortise cast in it, which forms the socket. The other three buttresses, ribs, or wings extend upward towards the top of the post. The post tapers upward and downward from the socket, as seen in fig. 1.

The panels are formed in the following manner: A short rod, $r$, is passed through each picket near its top, and another near its bottom, and the ends of the rods are bent so as to form hooks or eyes $e\ e\ e$. The pickets are then connected together by links $i\ i$, attached to the hooks $e\ e$, so as to form with the hooks a continuous chain from post to post, taking the place of supporting-rails or bars for the pickets. The panels being thus constructed, the end pickets A' A' of each panel are stepped in the sockets $s\ s$.

The end pickets A' A' are attached to the connecting-chains or rods in the same manner as the intermediate ones, A A, the rods passing through them and connecting them to the fence the same as any other picket. A small notch may be made to receive the rods, and a key provided to secure the latter to the pickets, if desired.

The whole forms a very neat, light, firm, and durable fence, which can be easily taken apart and transported from place to place, it being only necessary to raise the rings $m\ m$, and lift the pickets A' A' from their sockets, when the panels can be neatly rolled together, as shown in red lines in fig. 2.

Having thus described my invention, what I claim as new, and desire to secure by Letters Patent, is—

The combination of the pickets A' A', the rings or collars $m\ m$, the posts B B, having the sockets $s\ s$, the rods $r\ r$, and the links $i\ i$, substantially as described.

JOSEPH W. NORMAN.

Witnesses:
SAM. GRONDYKE,
EWD. BROWN.